(12) United States Patent
Wu et al.

(10) Patent No.: US 7,540,574 B2
(45) Date of Patent: Jun. 2, 2009

(54) MOUNTING APPARATUS FOR DATA STORAGE DEVICE

(75) Inventors: Chia-Kang Wu, Tu-Cheng (TW); Li-Ping Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 434 days.

(21) Appl. No.: 11/309,780

(22) Filed: Sep. 23, 2006

(65) Prior Publication Data

US 2008/0074018 A1   Mar. 27, 2008

(51) Int. Cl.
*H05K 5/00* (2006.01)
(52) U.S. Cl. .................. 312/223.2; 361/685; 312/332.1
(58) Field of Classification Search .................. 361/685; 312/223.2, 215, 222, 332.1; 292/32, 37, 292/42, 137, 163, 169, 175, 302, DIG. 11
See application file for complete search history.

(56) References Cited

U.S. PATENT DOCUMENTS 6,231,145 B1    5/2001  Liu
6,351,379 B1 *  2/2002  Cheng .......................... 361/685
6,431,615 B1 *  8/2002  Bastian ......................... 292/80
6,891,723 B1 *  5/2005  Lin et al. ...................... 361/685
7,019,965 B2 *  3/2006  Bradley et al. .............. 361/685
7,027,309 B2 *  4/2006  Franz et al. .................. 361/798
7,040,671 B2 *  5/2006  Su et al. ........................ 292/24
7,423,869 B2 *  9/2008  Su ................................ 361/685
2003/0184196 A1 * 10/2003  Hung ........................ 312/332.1
2007/0121302 A1 *  5/2007  Lee ............................. 361/726

* cited by examiner

*Primary Examiner*—Janet M Wilkens
(74) *Attorney, Agent, or Firm*—Wei Te Chung

(57) ABSTRACT

A mounting apparatus of a data storage device includes a chassis with a locking hole defined in a side wall of the chassis, a bracket configured for received the data storage device therein, a locking piece, and a driving post. The bracket is slidably received in the chassis. The bracket comprises a head portion with a guiding slot defined therein. The locking piece has a driven edge. The locking piece is slidably attached to the head portion of the bracket with the driven edge crossing the guiding slot and the locking piece inserted in the locking hole of the chassis. The driving post inserts in the guiding slot and resists against the driven edge of the locking piece. The driving post moves in the slot and exerts force on the driven edge of the locking piece to drive the locking piece to slide out of the locking hole.

16 Claims, 6 Drawing Sheets

MOUNTING APPARATUS FOR DATA STORAGE DEVICE

1. FIELD OF THE INVENTION

The present invention relates to mounting apparatuses, and more particularly to a mounting apparatus for a data storage device.

2. DESCRIPTION OF RELATED ART

In a conventional server or computer system, a plurality of devices, such as data storage devices, are mounted within an enclosure. In order to improve convenience of service and replacement of the devices, screwless mounting apparatuses are often provided.

For example, a mobile rack assembly includes a mounting bracket, a mobile rack, and a handle frame. The mounting bracket defines two locking holes in a top side thereof. The mobile rack is used to accommodate a data storage device, and can be slid into the mounting bracket. The handle frame is mounted on the mobile rack. A handgrip is pivotably attached to opposite sides of the handle frame. Two locking parts are formed on free ends of the handgrip, corresponding to the locking holes of the mounting bracket. In assembly, the mobile rack is slid into the mounting bracket. The handgrip is rotated down. The locking parts of the handgrip engage into the locking holes of the mounting bracket, and urge the mobile rack to further slide into the mounting bracket. In disassembly, the handgrip is rotated up. The locking parts press against edges of the locking holes. The mobile rack is thereby pulled outward. When the locking parts are disengaged from the locking holes, the mobile rack is thus slid out from the mounting rack. However, this mounting means is still inconvenient.

What is needed, therefore, is a mounting apparatus for providing convenience in assembly and removal of a device within an enclosure.

SUMMARY OF THE INVENTION

A mounting apparatus of a data storage device includes a chassis with a locking hole defined in a side wall of the chassis, a bracket configured for received the data storage device therein, a locking piece, and a driving post. The bracket is slidably received in the chassis. The bracket comprises a head portion with a guiding slot defined therein. The locking piece has a driven edge. The locking piece is slidably attached to the head portion of the bracket with the driven edge crossing the guiding slot and the locking piece inserted in the locking hole of the chassis. The driving post inserts in the guiding slot and resists against the driven edge of the locking piece. The driving post moves in the slot and exerts force on the driven edge of the locking piece to drive the locking piece to slide out of the locking hole.

Other advantages and novel features will be drawn from the following detailed description of preferred embodiments with attached drawings, in which:

DETAILED DESCRIPTION OF THE INVENTION

Figure 1:
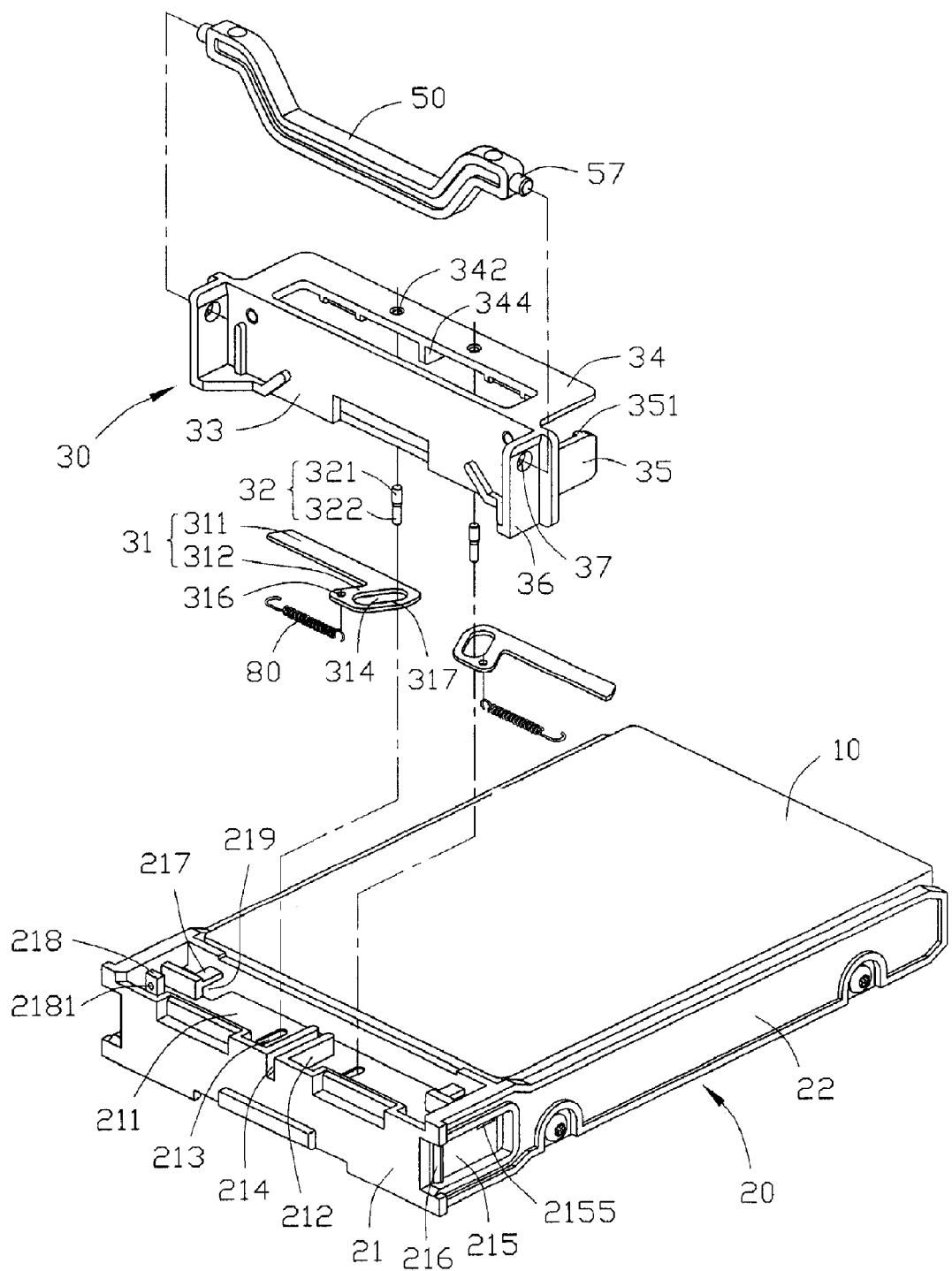
FIG. 1 is an exploded, isometric view of a bracket with a data storage device and a sliding member of a mounting apparatus of a preferred embodiment of the present invention.
Figure 2:
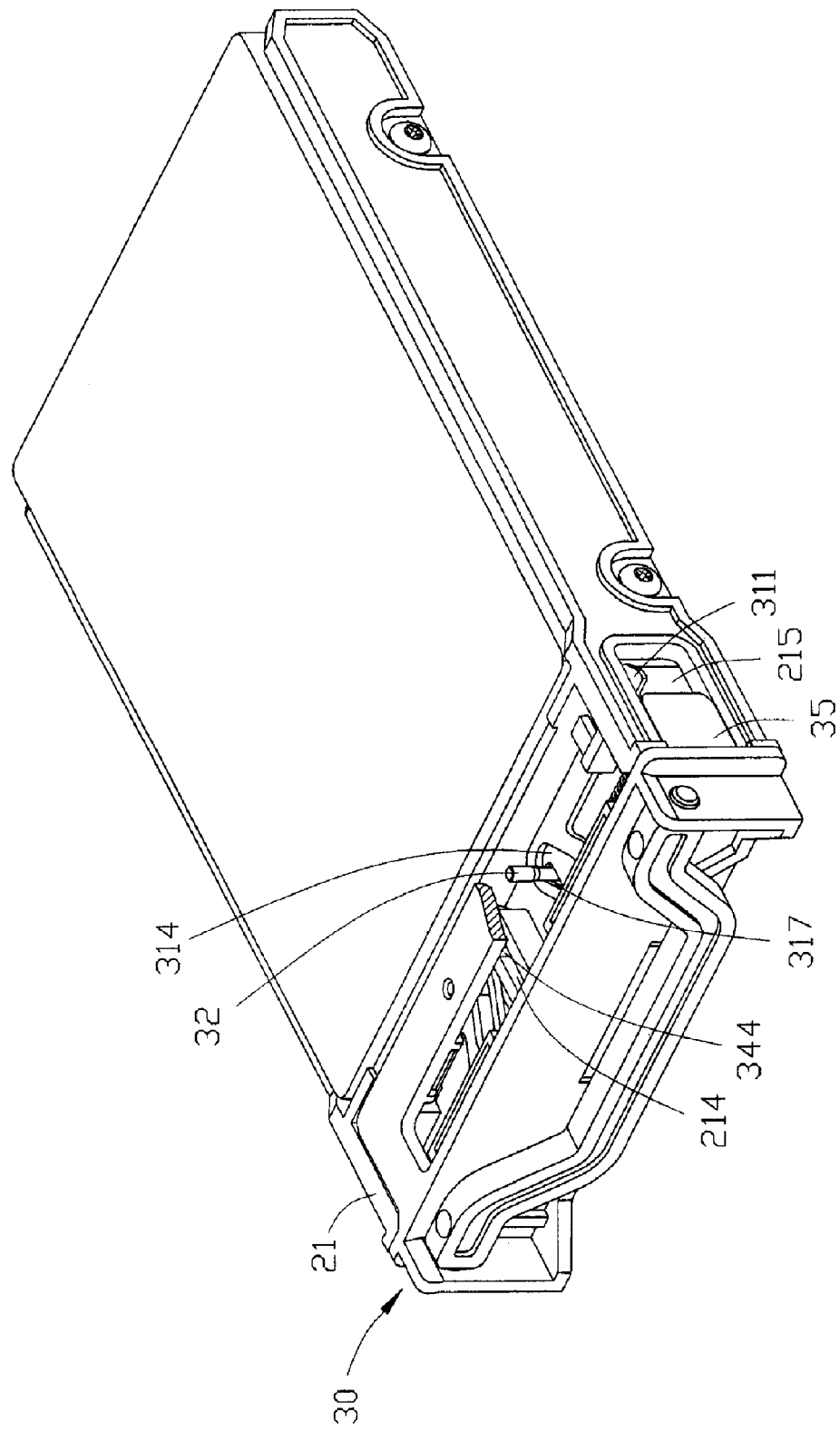
FIG. 2 is a view of the bracket and the sliding member of FIG. 1 assembled but partially cut away.
Figure 3:
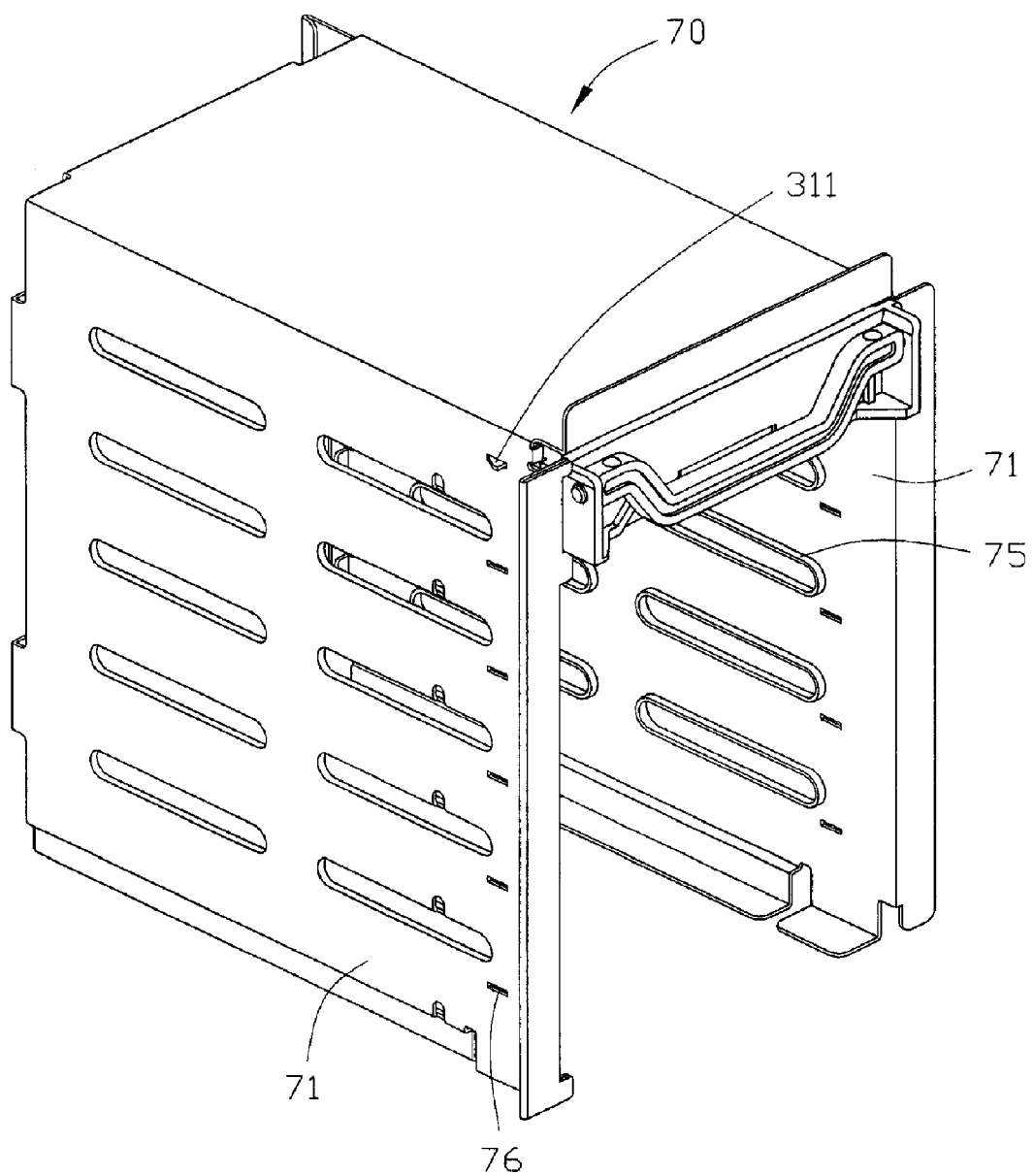
FIG. 3 is an isometric view of the bracket of FIG. 2 secured in a chassis.
Figure 4:
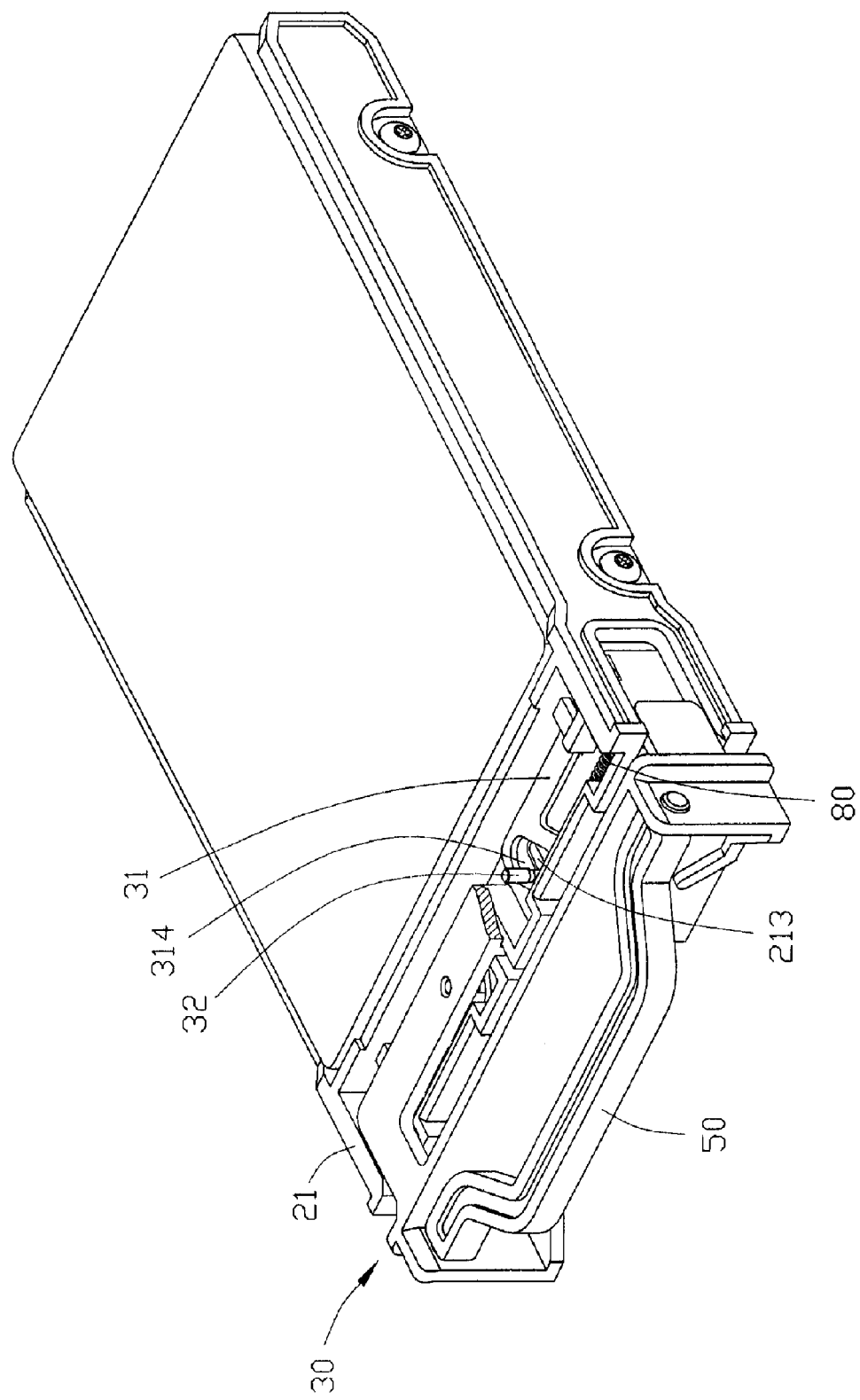
FIG. 4 is similar to FIG. 2, but showing the sliding member in another position.
Figure 5:
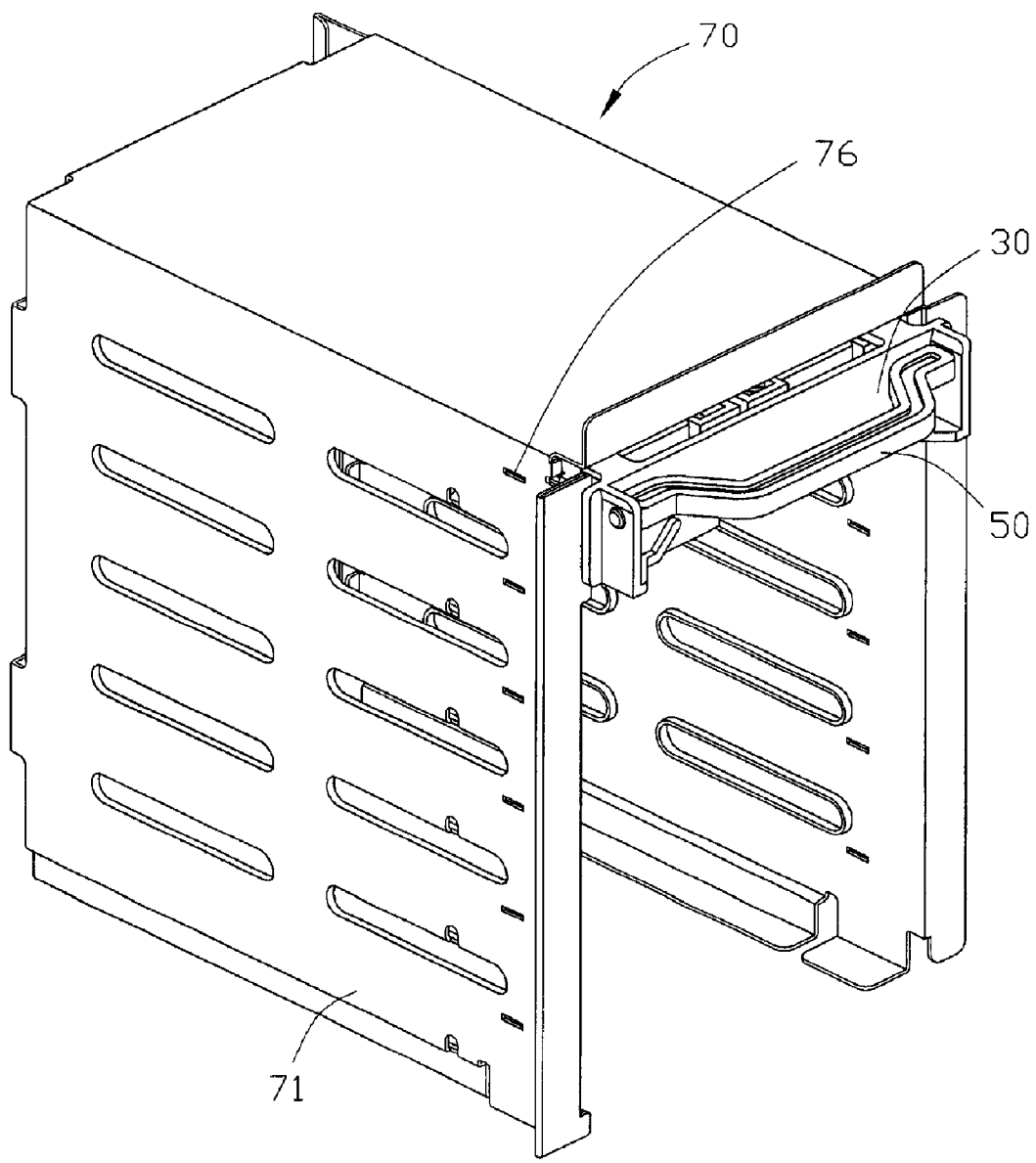
FIG. 5 is similar to FIG. 3, but showing the bracket in an unsecured position.

Referring to FIGS. 1 to 3, a mounting apparatus of a preferred embodiment of the present invention includes a chassis 70, a bracket 20, and a sliding member 30 slidably attached on the bracket 20 for mounting a data storage device 10.

The bracket 20 includes a head portion 21, and a pair of arms 22 extending from opposite sides of the head portion 21. The data storage device 10 is mounted on the bracket 20 and between the two arms 22. The head portion 21 defines a sliding groove 215 in each of the sides. A stop block 216 extends from a bottom surface bounding each of the sliding grooves 215. A top of the head portion 21 is sunk in to form a recess with a bottom plate 211 forming a bottom of the recess. A pair of the guiding slots 213 is defined symmetrically in the bottom plate 211. The guiding slot 213 extends parallel to the arm 22 of the bracket 20. The bottom plate 211 forms a pair of plates 212 between the pair of guiding slots 213, and defines a channel 214 between the pair of plates 212. The bottom plate 211 forms a block 218 and a restricting piece 217 beside each of opposites sides of the bottom plate 211. The block 218 defines a securing hole 2181 therein. The restricting piece 217 is a L-shaped piece, and connected with a wall of the head portion 21 to define a restricting space 219 therebetween. A bottom of the sliding groove 215 defines a gap 2155 in alignment with the restricting space 219.

A pair of locking pieces 31 is configured to be slidably mounted on the bottom plate 211 of the bracket 20. The locking piece 31 includes a tongue piece 311 and a dragging piece 312 extending aslant from one end of the tongue piece 311. The dragging piece 312 defines a slot 314 along the dragging piece 312. An extending direction of the slot 314 is slanting with respect to an extending direction of the guiding slot 213. The slot 314 includes a driven edge 317 parallel to the extending direction of the slot 314. The dragging piece 312 defines a securing hole 316 corresponding to the securing hole 2181 of the bracket 21.

The sliding member 30 includes a front panel 33. The front panel 33 forms a pair of end walls 36 extending rearwards beside opposites sides of the front panel 33, and a pair of elastic clasps 35 extending forward opposite to the pair of end walls 36. Each of the end walls 36 defines a pivot hole 37 therein. Each of the clasps 35 respectively protrudes a protrusion 351 on a distal end thereof toward each other. A cover 34 extends forward from a top edge of the front panel 33, and is located above the pair of clasps 35. The cover 34 defines a pair of securing holes 342 corresponding to the pair of the guiding slots 213 of the bracket 20. A tab 344 extends down from a bottom of the cover 34 corresponding to the channel 214.

Two driving posts 32 for securing in the securing holes 342 of the sliding member 30, each include a securing portion 321, and a driving portion 322 below the securing portion 321.

A handle 50 is configured to be pivotably mounted on the end walls 36 of the sliding member 30. The handle 50 includes a pair of pivots 57 corresponding to the pivot holes 37 of the end walls 36.

The chassis 70 includes a pair of side walls 71. Each of the side walls 71 respectively forms a plurality of supporting brims 75 extending in toward each other. A plurality of locking holes 76 is defined on the side walls 71 corresponding to each of the supporting brims 51.

In assembly, each of the two pivots 57 of the handle 50 is inserted into the corresponding pivot hole 37 to pivotably mount the handle 50 on the sliding member 30. The securing portion 321 of each driving post 32 is interferentially inserted in the securing hole 342 of the cover 34, and retained in the securing hole 342 to secure the driving post 32 on the sliding member 30.

The tongue piece 311 of the locking piece 31 is inserted in the restricting space 219 and the gap 2155 to restrict the locking piece 31 moving in a direction defined by the restricting space 219 and the gap 2155. One end of a spring 30 is secured in the securing hole 316 of the locking piece 31, and the other end of the spring 30 is secured in the securing hole 2181 of the head portion 21 to slidably mount the locking piece 31 on the bottom plate 211. When the spring 30 is at an original length, a front end of the slot 314 is aligned with a front end of the guiding slot 213, and a rear end of the slot 314 is located outboard of a rear end of the guiding slot 213. The driven edge 317 of slot 314 is placed across the guiding slot 213.

The pair of clasps 35 of the sliding member 30 is pulled outwards, and the sliding member 30 moves to the head portion 21. The tab 344 inserts in the channel 214. The driving portion 322 of the driving post 32 inserts in the front end of slot 314 and the guiding slot 213, and resists against the driven edge 317 of the slot 314. The pair of clasps 35 is placed in alignment with the pair of sliding grooves 215 of the head portion 21. Then, the pair of clasps 35 is relaxed to have each of the pair of clasps 35 received in the corresponding sliding grooves 215 with the protrusions 351 of the clasps 35 resisting against the bottoms of the sliding grooves 215 to sandwich the head portion 21 therebetween, so the sliding member 30 is slidably mounted on the head portion 21 of the bracket 20.

The bracket 20 slides into the chassis 70 by a bottom of the bracket 20 sliding on the supporting brims 75 of the side walls 71. Simultaneously, tongue piece 311 of the locking piece 31 is pressed by the side wall 71 to force the locking piece 31 to slide into the head portion 21. The spring 30 is compressed because of the movement of the locking piece 31. The bracket 20 slides in the chassis 70 until the tongue piece 311 of locking piece 31 is aligned with the locking hole 76, and the side wall 71 doesn't press the tongue piece 311. Then, the locking piece 31 is urged to slide by the spring 30, and the tongue piece 311 inserts into the locking hole 76 of the chassis 70 to secure the bracket 20 on the chassis 70. The locking piece 31 slides until the driven edge 317 of the slot 314 resists against the driving post 32.

Referring to FIGS. 2 to 5, in disassembly of the bracket 20 from the chassis 70, the handle 50 of the sliding member 30 is pulled rearwards. The sliding member 30 slides rearwards on the head portion 21 of the bracket 20. When the sliding member 30 slides on the head portion 21, the driving post 32 attached on the sliding member 30 slides in the guiding slot 213 from back to front. Because the driven edge 317 of the slot 314 is placed across the guiding slot 213, and the driving post 32 resists against the driven edge 317, when the driving post 32 slides in the slot 314, the driven edge 317 is pulled by the driving post 32 to drive the locking piece 31 to slide into the head portion 21. The spring 30 is compressed. The tongue piece 311 of the locking piece 31 slides out of the locking hole 76 of the chassis 70.

The sliding member 30 slides on the head portion 21 until the protrusions 351 of the sliding member 30 resist against the stop blocks 216 of the head portion 21. The handle 50 is further pulled rearwards to pull the bracket 20 with the data storage device 10 out of the chassis 70.

Figure 6:
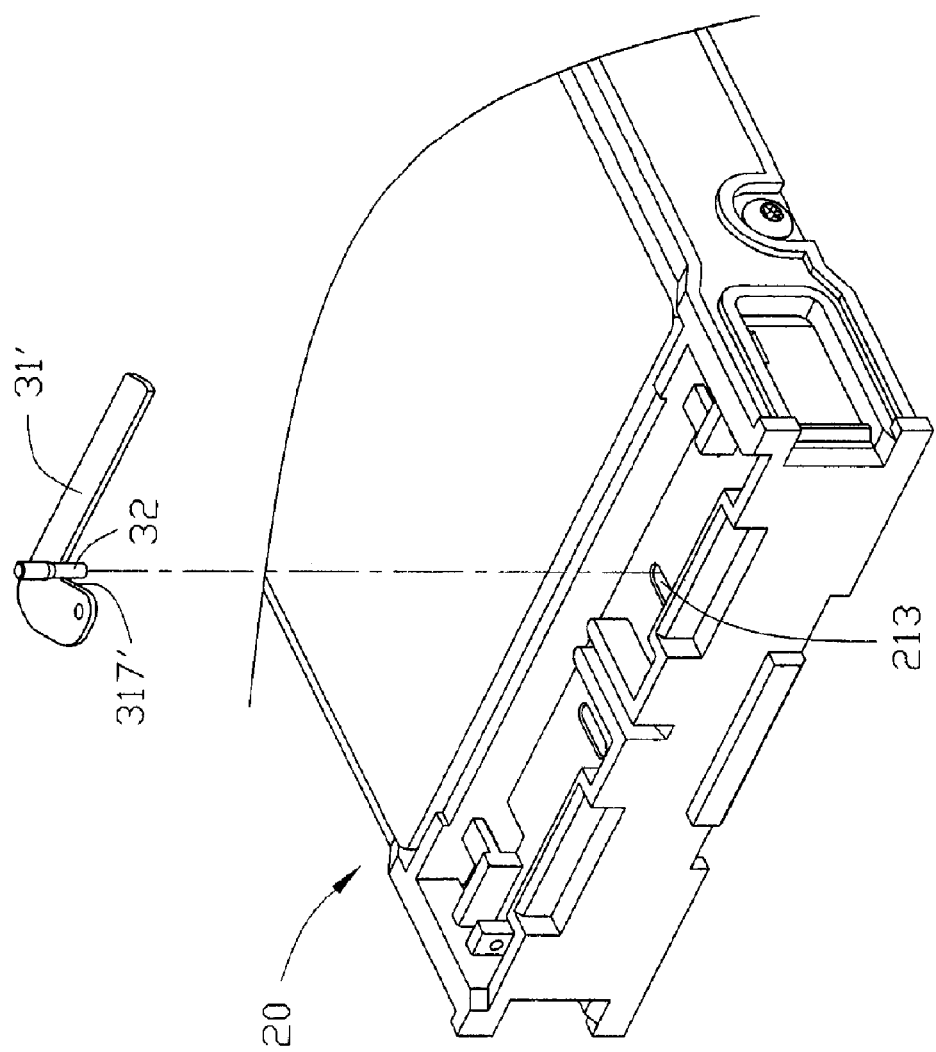
FIG. 6 is a partial view of the mounting apparatus of another embodiment of the present invention.

Referring to FIG. 6, in another embodiment of the present invention, the slot 314 is omitted from a locking piece 31'. A driven edge 317', which resists against the driving post 32, is formed as one edge of the locking piece 31'. An extending direction of the driven edge 317' is slanting with respect to the extending direction of the guiding slot 213.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed. pg,9

What is claimed is:

1. A mounting apparatus for a data storage device, comprising:
   a chassis comprising at least one side wall, the side wall defining a locking hole;
   a bracket configured for receiving the data storage device therein, the bracket slidably received in the chassis, the bracket comprising a head portion with a guiding slot defined therein;
   a locking piece having a driven edge, the locking piece slidably attached to the head portion of the bracket with the driven edge crossing the guiding slot and the locking piece inserted in the locking hole of the chassis; and
   a driving post inserted in the guiding slot resisting against the driven edge of the locking piece;
   wherein the driving post is configured to be movable in the guiding slot so as to exert force on the driven edge of the locking piece to drive the locking piece to slide out of the locking hole.

2. The mounting apparatus as described in claim 1, wherein the driving post is secured on a sliding member, the sliding member is slidably mounted on the head portion and slides on the head portion in an extending direction of the guiding slot.

3. The mounting apparatus as described in claim 2, wherein a handle is pivotably mounted on the sliding member for pulling the sliding member to slide on the head portion.

4. The mounting apparatus as described in claim 2, wherein the head portion defines a pair of sliding grooves on opposite sides, and the sliding member comprises a pair of clasps respectively slidably received in the sliding groove to sandwich the head portion therebetween. pg,10

5. The mounting apparatus as described in claim 4, wherein each of the clasps comprises a protrusion, and a stop block extends in each of the sliding grooves adapted for resisting against the protrusion to prevent the clasp from sliding out of the sliding groove.

6. The mounting apparatus as described in claim 1, wherein further comprising a spring connecting the locking piece with the head portion.

7. The mounting apparatus as described in claim 1, wherein the locking piece comprises a tongue piece adapted for inserting in the locking hole, and a dragging piece on which the driven edge is formed, the dragging piece extends aslant from one end of the tongue piece.

8. The mounting apparatus as described in claim 7, wherein the dragging piece defines a slot extending aslant with respect to the guiding slot, an edge of the slot serves as the driven edge, and the driving post inserts in the slot to resist against the driven edge.

9. The mounting apparatus as described in claim 7, wherein the head portion comprises an L-shaped restricting piece to define a restricting space in the head portion, and the tongue piece of the locking piece is inserted in the restricting space to restrict the locking piece sliding in a direction defined by the restricting piece.

10. A mounting apparatus for a data storage device, comprising:
- a chassis comprising at least one side wall, the side wall defining a locking hole;
- a bracket configured for receiving the data storage device therein, the bracket slidably received in the chassis, the bracket comprising a head portion, and the head portion defining a pair of sliding grooves extending in a first direction on opposite sides of the head portion;
- a locking piece slidably attached to the head portion of the bracket with one end of the locking piece inserted in the locking hole of the chassis, the locking piece having a driven edge extending in a second direction aslant with respect to the first direction; and pg,11
- a sliding member slidably mounted on the head portion, the sliding member comprising a pair of clasps respectively slidably received in the sliding grooves to sandwich the head portion therebetween, the sliding member comprising a driving post resisting against the driven edge of the locking piece in a manner such that when the sliding member slides on the head portion with the clasps of the sliding member sliding in the sliding grooves of the head portions in the first direction, the driving post slides and exerts force on the driven edge of the locking piece to drive the locking piece to slide out of the locking hole.

11. The mounting apparatus as described in claim 10, wherein the head portion defines a guiding slot in the first direction, and the driving post is inserted in the guiding post.

12. The mounting apparatus as described in claim 10, wherein a handle is pivotably mounted on the sliding member for pulling the sliding member to slide on the head portion.

13. The mounting apparatus as described in claim 10, wherein each of the clasps comprises a protrusion, and a stop block extends in each of the sliding grooves adapted for resisting against the protrusion to prevent the clasp from sliding out of the sliding groove.

14. The mounting apparatus as described in claim 10, wherein further comprising a spring connecting the locking piece with the head portion.

15. The mounting apparatus as described in claim 10, wherein the locking piece comprises a tongue piece configured for inserting in the locking hole, and a dragging piece on which the driven edge is formed, the dragging piece extends aslant from one end of the tongue piece.

16. The mounting apparatus as described in claim 15, wherein the dragging piece defines a slot extending aslant with respect to the guiding slot, an edge of the slot pg,12 servers as the driven edge, and the driving post inserts in the slot to resist against the driven edge.

* * * * *